(12) United States Patent
Matsushima et al.

(10) Patent No.: US 8,330,922 B2
(45) Date of Patent: Dec. 11, 2012

(54) LIQUID CRYSTAL DEVICE AND ELECTRONIC APPARATUS

(75) Inventors: Toshiharu Matsushima, Tottori (JP); Tadashi Tsuyuki, Nagano (JP)

(73) Assignee: Sony Corporation, Tokyo (JP)

( * ) Notice: Subject to any disclaimer, the term of this patent is extended or adjusted under 35 U.S.C. 154(b) by 197 days.

(21) Appl. No.: 12/862,263

(22) Filed: Aug. 24, 2010

(65) Prior Publication Data

US 2011/0058115 A1   Mar. 10, 2011

(30) Foreign Application Priority Data

Sep. 8, 2009   (JP) ................. 2009-206780

(51) Int. Cl.
  *G02F 1/1343*  (2006.01)
  *G02F 1/1335*  (2006.01)
(52) U.S. Cl. ........................ 349/141; 349/106
(58) Field of Classification Search .......... None
  See application file for complete search history.

(56) References Cited

U.S. PATENT DOCUMENTS

2008/0165297 A1*  7/2008  Matsushima .................. 349/33

FOREIGN PATENT DOCUMENTS

JP   2009-025332   2/2009

* cited by examiner

*Primary Examiner* — Tina Wong
(74) *Attorney, Agent, or Firm* — K&L Gates LLP

(57) ABSTRACT

A liquid crystal device includes: a pair of substrates; a liquid crystal layer sandwiched between the pair of substrates; a display pixel and a viewing-angle control pixel that are substantially rectangular and disposed on at least one of the pair of substrates; a first electrode and a second electrode disposed in the viewing-angle control pixel; and a plurality of strip-like electrode portions that are provided to at least either the first electrode or the second electrode and spaced from one another across a width direction of the viewing-angle control pixel, the liquid crystal device being configured so that an electric field is generated between the first electrode and the second electrode to control the direction of alignment of liquid crystal molecules in the liquid crystal layer, thereby changing the luminance of the viewing-angle control pixel in a direction oblique to the front.

7 Claims, 13 Drawing Sheets

LIQUID CRYSTAL DEVICE AND ELECTRONIC APPARATUS

CROSS REFERENCES TO RELATED APPLICATIONS

The present application claims priority to Japanese Priority Patent Application JP 2009-206780 filed in the Japan Patent Office on Sep. 8, 2009, the entire content of which is hereby incorporated by reference.

BACKGROUND

The present application relates to a liquid crystal device having a display pixel and a viewing-angle control pixel, and also to an electronic apparatus.

As the liquid crystal device, there is a known liquid crystal device which includes, on a first substrate that is one of a pair of substrates sandwiching a liquid crystal layer, a pair of electrodes for driving the liquid crystal layer, and in which one of a pair of electrodes in a viewing-angle control region includes a plurality of strip-like portions that are electrically connected to each other and extend in the direction orthogonal to the initial alignment direction of liquid crystal molecules in the liquid crystal layer, and the other of the pair of electrodes in the viewing-angle control region is disposed with an insulating layer between the one electrode and the other electrode (JP-A-2009-25332, pp. 7 to 9, FIGS. 3 and 4).

According to an embodiment of the above-mentioned liquid crystal device, the viewing-angle control region is adjacent to a rectangular display area in the width direction (short side direction) of the display area, and the initial alignment direction of the liquid crystal molecules is the length direction (long side direction) of the viewing-angle control region that is also rectangular. The plurality of strip-like portions of one electrode extend in the width direction of the viewing-angle control region and are spaced in the length direction at predetermined intervals. That is, it has so-called FFS (Fringe Field Switching) electrode structure.

SUMMARY

In such a FFS mode liquid crystal device, when a driving voltage is applied between one and the other electrodes in the viewing-angle control region, an electric field is generated mainly in the direction orthogonal to the direction of extension of the strip-like portions of one electrode, i.e., the initial alignment direction of the liquid crystal molecules, whereby the initial alignment state of the liquid crystal molecules is disturbed, causing changes in the luminance of the viewing-angle control region in an oblique direction. That is, the luminance as seen from an oblique direction decreases, making the display difficult to see.

Meanwhile, at ends of the strip-like portions, the direction of the electric field between one and the other electrodes opposed to each other with the insulating layer therebetween is not always the same as the initial alignment direction of the liquid crystal molecules, and the liquid crystal molecule are slightly twisted. Therefore, at the ends of the strip-like portions in the viewing-angle control region, light leakage may occur due to optical rotation in the liquid crystal layer, whereby the contrast of the liquid crystal device as seen from the front will decrease.

Thus, it is desirable to solve at least a part of the problems mentioned above.

An embodiment is directed to a liquid crystal device including: a pair of substrates; a liquid crystal layer sandwiched between the pair of substrates; a display pixel and a viewing-angle control pixel that are substantially rectangular and disposed on at least one of the pair of substrates; a first electrode and a second electrode disposed in the viewing-angle control pixel; and a plurality of strip-like electrode portions that are provided to at least either the first electrode or the second electrode and spaced from one another across a width direction of the viewing-angle control pixel. The liquid crystal device is configured so that an electric field is generated between the first electrode and the second electrode to control the direction of alignment of liquid crystal molecules in the liquid crystal layer, thereby changing the luminance of the viewing-angle control pixel in a direction oblique to the front.

In this configuration, the plurality of strip-like electrode portions are arranged in parallel in the width direction of the rectangular viewing-angle control pixel. Therefore, as compared with the parallel arrangement in the length direction, the number of ends of strip-like electrode portions, which are susceptible to light leakage, can be reduced. That is, light leakage from the viewing-angle control pixel as seen from the front can be reduced, making it possible to provide a liquid crystal device that allows the viewing angle to be controlled, achieving excellent optical properties.

Another embodiment is directed to the liquid crystal device mentioned above, wherein at least the other of the pair of substrates has a light-shielding region that overlaps, in plan view, at least one end of the strip-like electrode portions. In this configuration, light leakage from the viewing-angle control pixel as seen from the front can be suppressed, making it possible to provide a liquid crystal device that allows the viewing angle to be controlled, achieving more improved optical properties.

Still another embodiment is directed to the liquid crystal device mentioned above, wherein the other of the pair of substrates has color filters of different colors including at least red, green, and blue, the display pixel is disposed corresponding to each of the color filters of the different colors, and the viewing-angle control pixel is disposed across and adjacent to the display pixels of the different colors.

Specifically, for example, in the case of a liquid crystal display having display pixels each disposed in an area that is defined by data lines and scanning lines intersecting the data lines and has a rectangular shape whose length direction is the direction of the date lines, and where red, green, and blue color filters are alternately disposed in the direction of the scanning lines and the display pixels are disposed corresponding to respective colors, a viewing-angle control pixel having a rectangular shape whose length direction is the direction of the scanning lines is disposed across the three colors, red, green, and blue.

In this configuration, as compared with the case where a viewing-angle control pixel is provided for a single display pixel, a smaller number of viewing-angle control pixels are necessary to change the luminance of each of the different color display pixels in an oblique direction.

Yet another embodiment is directed to the liquid crystal device mentioned above, wherein the display pixel is disposed in an area that is defined by data lines each electrically connected to a thin film transistor for driving and controlling the display pixel and scanning lines intersecting the data lines, and a thin film transistor for driving and controlling the viewing-angle control pixel has connected thereto one of the data lines, the one data line being corresponding to one of the display pixels of the different colors.

In this configuration, the viewing-angle control pixel can be driven/controlled without the need for data lines dedicated to viewing-angle control pixels.

Still yet another embodiment is directed to the liquid crystal device mentioned above, wherein the display pixel is disposed in an area that is defined by data lines each electrically connected to a thin film transistor for driving and controlling the display pixel and scanning lines intersecting the data lines, and a thin film transistor for driving and controlling the viewing-angle control pixel has connected thereto a dedicated data line different from the data lines corresponding to the display pixels of the different colors.

When a display pixel and a viewing-angle control pixel are to be separately driven using a same data line, separate scanning lines are necessary to increase the driving frequency. In the configuration of this embodiment, data lines dedicated to viewing-angle control pixels are provided. This allows the viewing-angle control pixels to share scanning lines with the display pixels. Therefore, the display pixels and the viewing-angle control pixels can be independently driven/controlled without the need for an increase in driving frequency. That is, an increase in power consumption can be suppressed.

Further another embodiment is directed to the liquid crystal device mentioned above, wherein the dedicated data line is disposed along one of the data lines, the one data line being corresponding to the display pixel of red.

When a data line dedicated to viewing-angle control pixels is disposed along a data line for display pixels, there is a possibility that the dedicated data line enters the pixel area of a display pixel. In such a case, the thickness of the liquid crystal layer in the pixel area varies at the portion provided with the dedicated data line, and this is likely to degrade the color uniformity of light transmitted through the color filter. In the configuration of this embodiment, the dedicated data line is provided to red display pixels which have low visibility. Therefore, even if color nonuniformity is caused, it will not be prominent.

Still further another embodiment is directed to the liquid crystal device mentioned above, wherein the dedicated data line is disposed so as to overlap, in plan view, one end of the strip-like electrode portions.

In this configuration, the dedicated data line functions as a light-shielding region, making it possible to suppress light leakage from one end of the strip-like electrode portions in the viewing-angle control pixel.

Yet further another embodiment is directed to the liquid crystal device mentioned above, wherein the display pixels of the different colors are took as a single set, and the viewing-angle control pixel is disposed adjacent to a plurality of the sets.

In this configuration, as compared with the case where the viewing-angle control pixel is disposed corresponding to a single set of display pixels, the aperture ratio of the viewing-angle control pixel can be improved.

Still yet further another embodiment is directed to an electronic apparatus including the liquid crystal device mentioned above. This configuration makes it possible to provide an electronic apparatus that drives viewing-angle control pixels depending on the environment of usage so that, for example, the displayed information is beautifully presented only to the user.

Additional features and advantages are described herein, and will be apparent from the following Detailed Description and the figures.

DETAILED DESCRIPTION

Figure 1A:
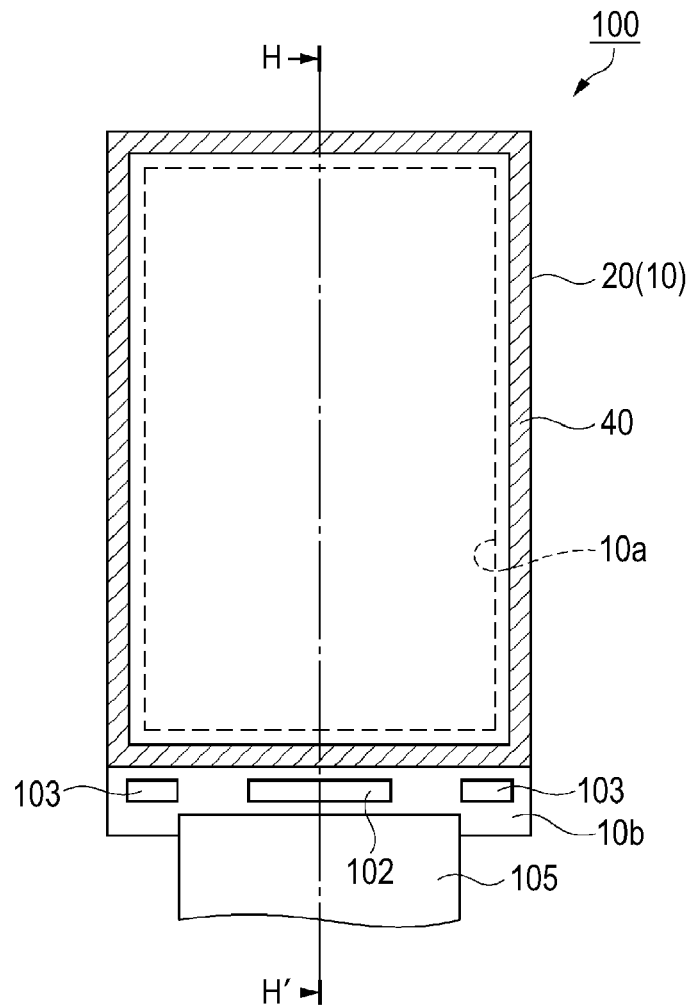
FIG. 1A is a schematic plan view showing the configuration of a liquid crystal device according to a first embodiment.

The present application will be described below with reference to the drawings according to an embodiment. In the drawings, the components to be described are suitably enlarged or reduced so as to be recognizable.

(First Embodiment)

<Liquid Crystal Device>

Figure 1B:
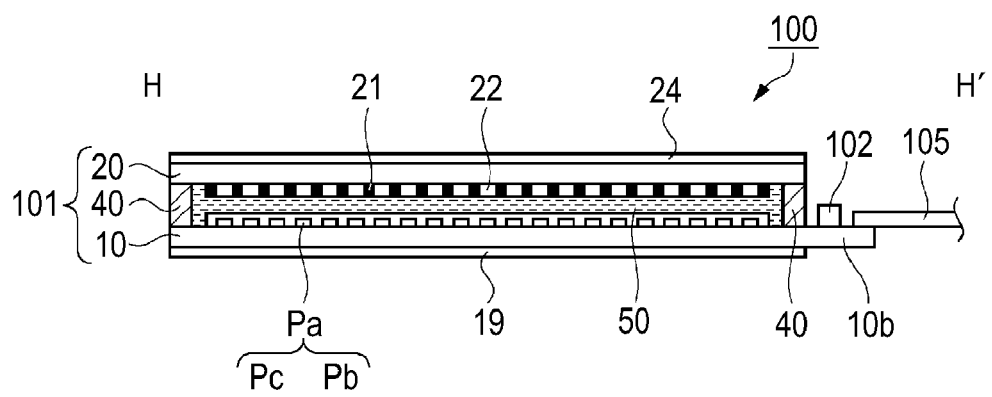
FIG. 1B is a schematic cross section taken along the line H-H' of FIG. 1A.
Figure 2:
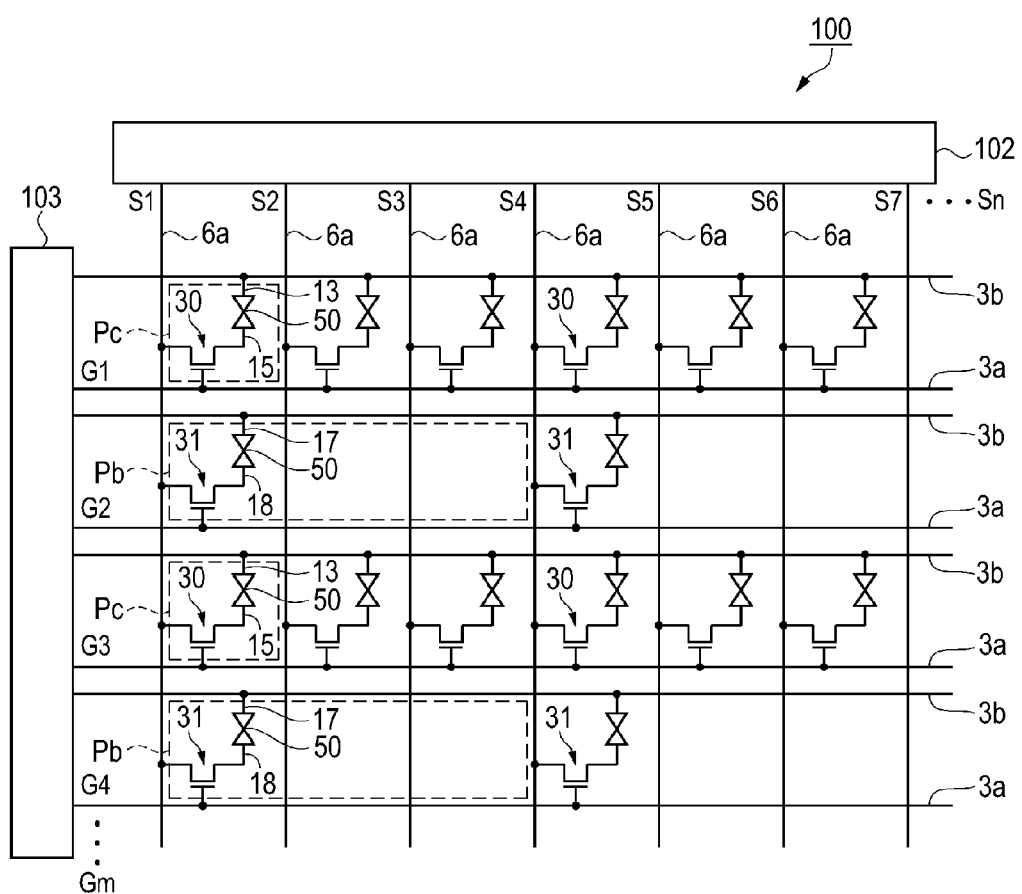
FIG. 2 shows an equivalent circuit schematic of the liquid crystal device according to the first embodiment.
Figure 3:
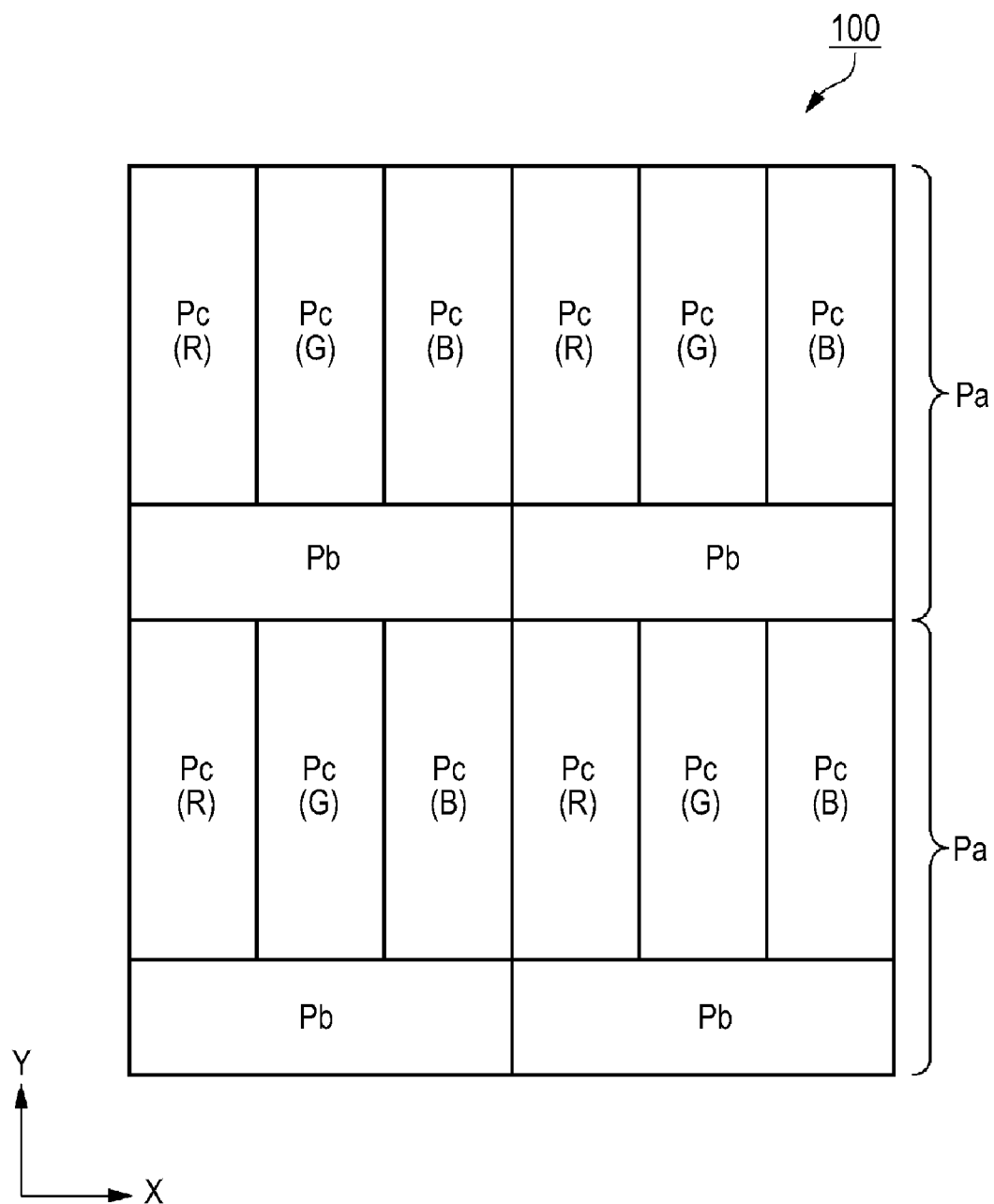
FIG. 3 is a schematic diagram showing the arrangement of display pixels and viewing-angle control pixels.
Figure 4A:
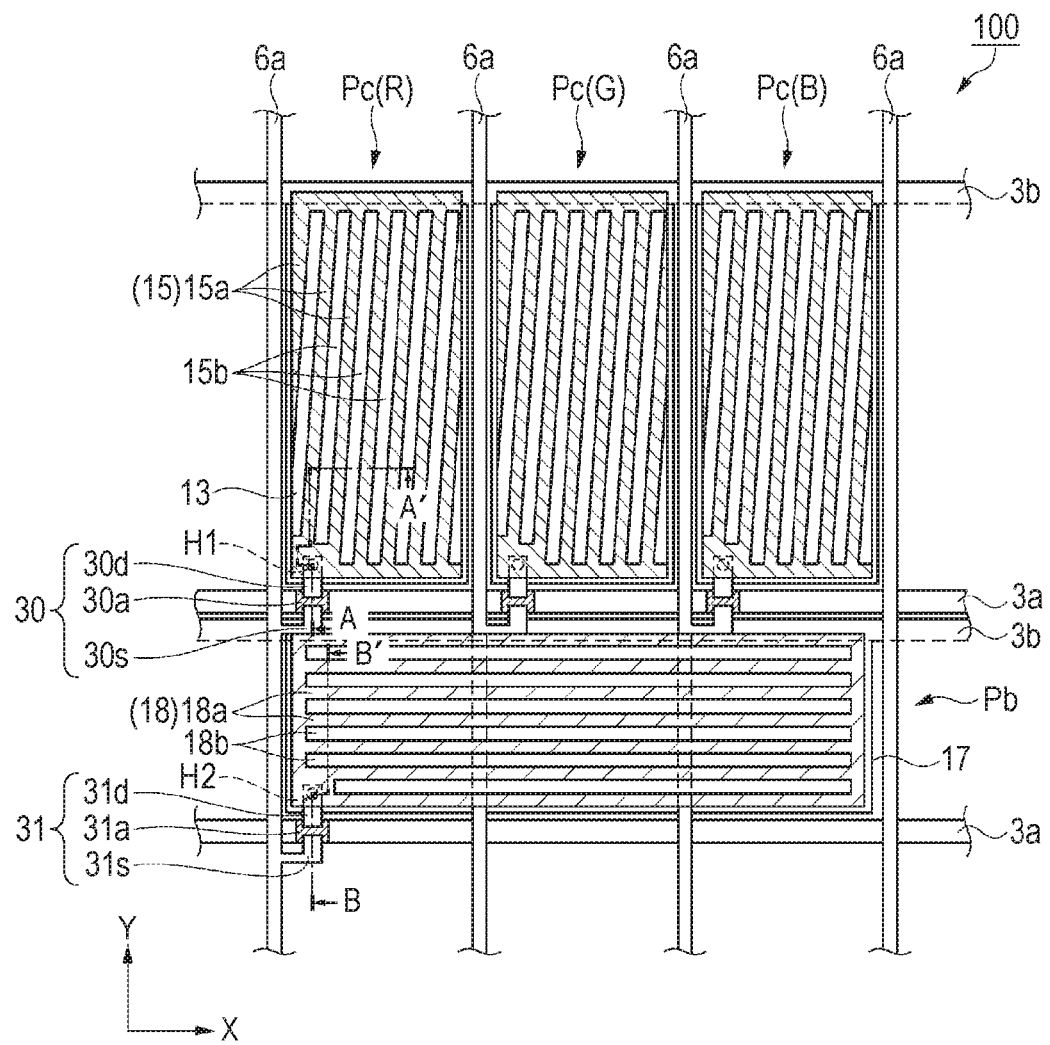
FIG. 4A is a schematic plan view showing the configurations of a display pixel and a viewing-angle control pixel.
Figure 4B:
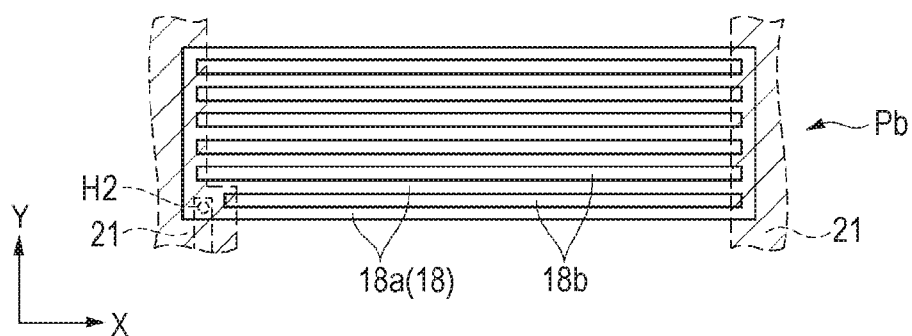
FIG. 4B is a schematic plan view of a light-shielding region in a viewing-angle control pixel.
Figure 5A:
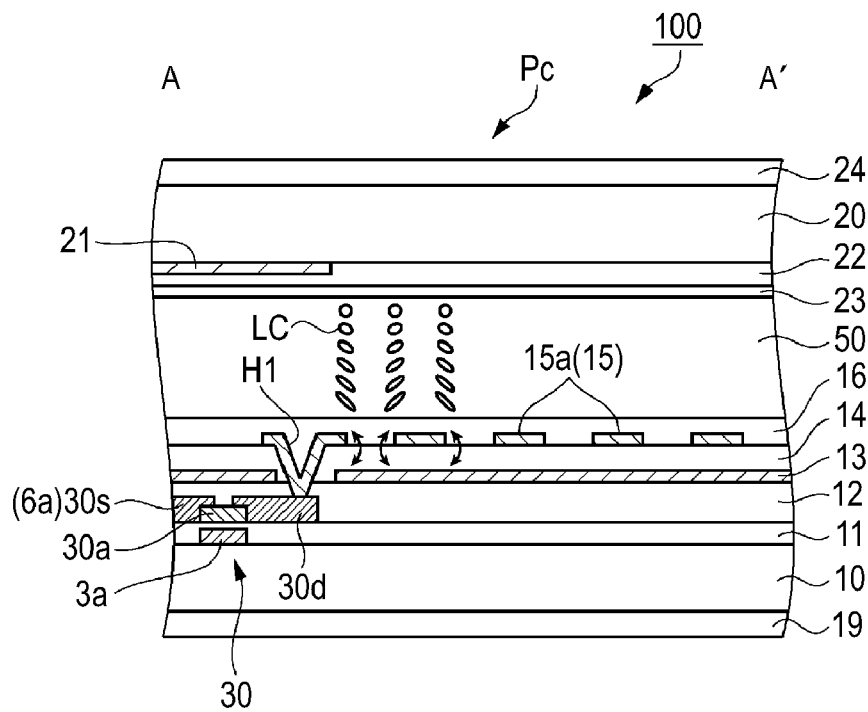
FIG. 5A is a schematic cross section showing the structure of a display pixel taken along the line A-A' of FIG. 4A.
Figure 5B:
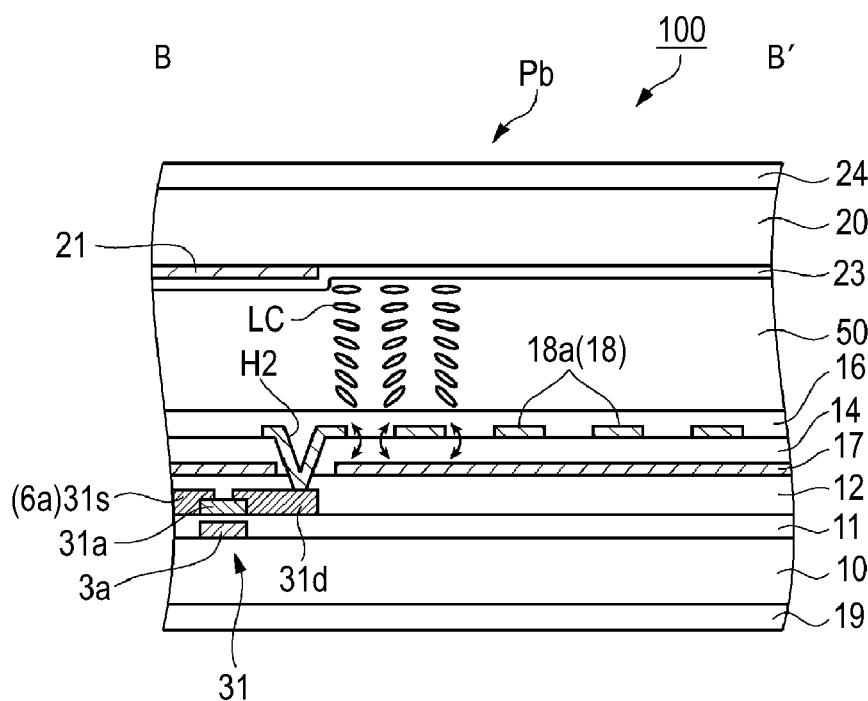
FIG. 5B is a schematic cross section showing the structure of a viewing-angle control pixel taken along the line B-B' of FIG. 4A.
Figure 6A:
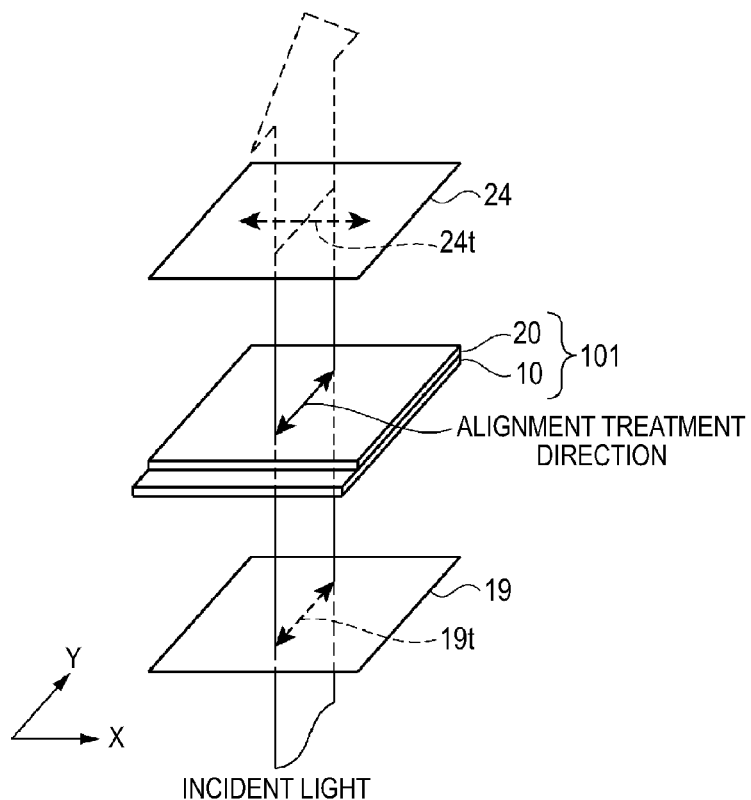
FIGS. 6A to 6C are schematic diagrams showing the optical design requirements of the liquid crystal device according to the first embodiment.
Figure 6B:
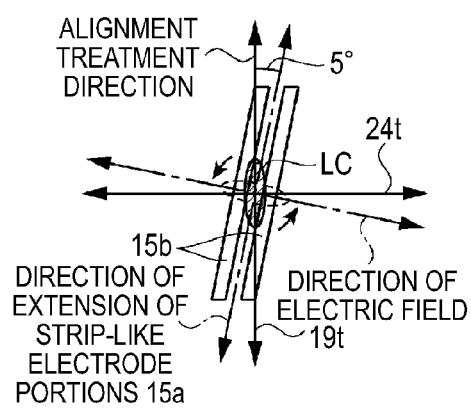
Figure 6C:
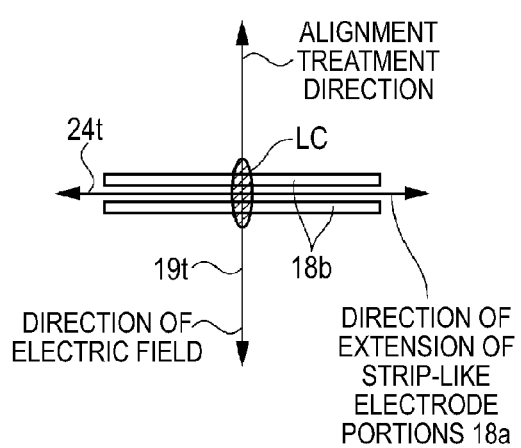

A liquid crystal device according to this embodiment will be described with reference to FIGS. 1A and 1B, FIG. 2, FIG. 3, FIGS. 4A and 4B, FIGS. 5A and 5B, FIGS. 6A to 6C, and FIG. 7. FIG. 1A is a schematic plan view showing the configuration of the liquid crystal device according to the first embodiment, and FIG. 1B is a schematic cross section taken along the line H-H' of FIG. 1A. FIG. 2 shows an equivalent circuit schematic of the liquid crystal device according to the first embodiment. FIG. 3 is a schematic diagram showing the arrangement of display pixels and viewing-angle control pixels. FIG. 4A is a schematic plan view showing the configurations of a display pixel and a viewing-angle control pixel, and FIG. 4B is a schematic plan view of a light-shielding region in a viewing-angle control pixel. FIG. 5A is a schematic cross section showing the structure of a display pixel taken along the line A-A' of FIG. 4A, and FIG. 5B is a schematic cross section showing the structure of a viewing-angle control pixel taken along the line B-B' of FIG. 4A. FIGS. 6A to 6C are schematic diagrams showing the optical design requirements of the liquid crystal device according to the first embodiment.

As shown in FIGS. 1A and 1B, the liquid crystal device 100 according to this embodiment includes as a pair of substrates an element substrate 10 and a counter substrate 20. The element substrate 10 and the counter substrate 20 are disposed in predetermined positions and are opposed to each other at a fixed interval. The element substrate 10 and the counter substrate 20 are sealed by a sealant 40, and the space created thereby is filled with a liquid crystal layer 50 with positive dielectric anisotropy. The element substrate 10, the counter substrate 20, and the liquid crystal layer 50 sandwiched therebetween are called a liquid crystal cell 101.

The area inside the frame-like sealant 40 provided along the sides of the counter substrate 20 serves as a display area 10a. A plurality of pixels Pa are disposed in the display area 10a.

The element substrate 10 is a transparent glass substrate, for example, and has on its side facing the liquid crystal layer 50 a plurality of pixels Pa and thin film transistors for driving/controlling the pixels Pa. Each pixel Pa includes a display pixel Pc and a viewing-angle control pixel Pb.

The counter substrate 20 is also a transparent glass substrate, for example, and has on its side facing the liquid crystal layer 50 color filters 22 and a light-shielding portion 21. The color filters 22 include filters of different colors.

The light-shielding portion 21 is made of a material with light-blocking effects, such as a resin material, and is provided to divide the color filters 22 into filters of different colors corresponding to the pixels Pa.

On the surface on the opposite side of the element substrate 10 from the side facing the liquid crystal layer 50, a polarizing plate 19 is provided as a polarizing element. Likewise, on the surface on the opposite side of the element substrate 20 from the side facing the liquid crystal layer 50, a polarizing plate 24 is provided as a polarizing element. The polarizing plates 19 and 24 are not limited to simple polarizing plates, and may each be combined with an optical film such as a retardation film, or have an anti-glare coating or a hard coating on the light entry or light exit surface thereof.

The element substrate 10 has a terminal portion 10b projecting from the near side of the counter substrate 20. The terminal portion 10b has disposed thereon drivers ICs 102 and 103 that are semiconductor devices for driving the liquid crystal device 100.

The driver IC 102 has a data line driving circuit, and the driver IC 103 has a scanning line driving circuit.

The driver IC 102 is plane-mounted in the approximate center of the terminal portion 10b, while the driver IC 103 is plane-mounted near each end of the terminal portion 10b.

The terminal portion 10b also has provided thereto interconnect substrate 105 for making a connection with an external drive circuit. The interconnect substrate 105 is a flexible printed circuit (FPC), for example, and is sometimes referred to as an FPC 105.

Such a liquid crystal device 100 is a so-called actively driven, transmissive liquid crystal device. When used, illumination is provided, for example, by an illumination device (not illustrated) having a light source such as light-emitting diode (LED) or electroluminescence (EL).

As shown in FIG. 2, the liquid crystal device 100 has a plurality of data lines 6a connected to the driver IC 102 having a data line driving circuit and a plurality of scanning lines 3a and common lines 3b connected to the driver IC 103 having a scanning line driving circuit. The data lines 6a and the scanning lines 3a intersect each other in an insulating manner. In the areas defined by the data lines 6a and the scanning lines 3a, the display pixels Pc and the viewing-angle control pixels Pb are provided.

Each display pixel Pc includes a common electrode 13, a pixel electrode 15, and a thin film transistor 30 that serves as a switching device. The gate of the thin film transistor 30 is connected to a scanning line 3a, the source is connected to a data line 6a, and the drain is connected to the pixel electrode 15. The common electrode 13 is connected to a common line 3b.

Each viewing-angle control pixel Pb includes a common electrode 17 that serves as a first electrode, a pixel electrode 18 that serves as a second electrode, and a thin film transistor 31 that serves as a switching device. The gate of the thin film transistor 31 is connected to a scanning line 3a, the source is connected to a data line 6a, and the drain is connected to the pixel electrode 18. The common electrode 17 is connected to a common line 3b.

The driver IC 102 supplies image signals S1, S2, . . . , and Sn to respective display pixels Pc and viewing-angle control pixels Pb through the data lines 6a. The image signals S1 to Sn may be supplied in this order in a line sequential manner, and may alternatively be supplied to a plurality of adjacent data lines 6a in groups.

The driver IC 103 supplies scanning signals G1, G2, . . . , and Gm to the scanning lines 3a in a pulsed manner at predetermined timings. The scanning signals G1, G2, . . . , and Gm are applied in this order to the gates of the thin film transistors 30 and 31 in a line sequential manner.

By the input of the scanning signals G1, G2, . . . , and Gm to turn on the thin film transistors 30, switching devices, for a given period of time, the image signals S1, S2, . . . , and Sn supplied from the data lines 6a are written in the pixel electrodes 15 at predetermined timings. The image signals S1, S2, . . . , and Sn of predetermined levels written in the liquid crystal layer 50 through the pixel electrodes 15 are each retained for a given period of time between the pixel electrode 15 and the common electrode 13 opposed thereto via the liquid crystal layer 50.

That is, the electric field generated between the common electrode 13 and the pixel electrode 15 drives/controls the liquid crystal layer 50, and the display pixel Pc performs display based on the image signal.

In the viewing-angle control pixels Pb, the thin film transistor 31 that serves as a switching device is turned on for a given period of time by a specific scanning signal, whereby an image signal of a predetermined level supplied from the data line 6a is written in the pixel electrode 18 at a predetermined timing, and is retained for a given period of time between the pixel electrode 18 and the common electrode 17 opposed thereto via the liquid crystal layer 50.

As a result, the viewing-angle control pixel Pb is driven to change the luminance of the viewing-angle control pixel Pb in a direction oblique to the front. The detail description of the mechanism of viewing-angle control will be given later.

A thin film transistor is called TFT (Thin Film Transistor). The thin film transistors 30 and 31 are hereinafter referred to as TFTs 30 and 31.

As shown in FIG. 3, taking the direction of extension of the scanning lines 3a as the direction X and the direction of extension of the data lines 6a as the direction Y, the pixels Pa in the display area 10a are arranged in matrix in the directions X and Y (see FIG. 1A).

Each pixel Pa includes display pixels Pc and viewing-angle control pixels Pb each having a substantially rectangular shape. The display pixels Pc are arranged corresponding to filers of three different colors, i.e., red (R), green (G), and blue (B), of the color filters 22 on the counter substrate 20. The display pixels Pc have their length direction in the direction Y, and the display pixels Pc corresponding to different colors R, G, and B are arranged side by side in this order in the direction X. Such display pixels Pc are sometimes referred to as sub pixels Pc in relation to pixels Pa.

In contrast, the viewing-angle control pixels Pb have their length direction in the direction X, and are each adjacent, in the direction Y, to the display pixels Pc arranged side by side corresponding to the different colors. The viewing-angle control pixels Pb do not include any color filter. The viewing-angle control pixels Pb may include a color filter. In this embodiment, the configuration may also be such that the color filters 22 of red (R), green (G), and blue (B) corresponding to the display pixels Pc are successively arranged in the direction Y (formed in stripes), and each viewing-angle control pixel Pb includes the filters of R, G, and B in the corresponding positions on the counter substrate 20.

The two-dimensional size of a viewing-angle control pixel Pb is nearly equal to that of a display pixel Pc.

Next, the configurations of the display pixels Pc and the viewing-angle control pixels Pb will be described in further detail. As shown in FIG. 4A, in each of the pixel areas defined by the data lines 6a and the scanning lines 3a, a display pixel Pc has a pixel electrode 15 that is substantially rectangular in plan view. Further, a common electrode 13 is disposed in a position overlapping the pixel electrode 15 in plan view.

Near each of the intersections of the data lines 6a and the scanning lines 3a, a TFT 30 is disposed on the scanning line 3a.

The pixel electrode 15 is formed of a transparent conductive film, such as ITO (Indium Tin Oxide), for example, and has a plurality of strip-like electrode portions 15a that extend in the length direction of the pixel area and are spaced at predetermined intervals in the width direction. Between the strip-like electrode portions 15a are slit-like spaces, which are hereinafter referred to as slits 15b. The strip-like electrode portions 15a (or slits 15b) are slightly inclined in the direction crossing the direction of extension of the data lines 6a, i.e., the direction Y.

The pixel electrode 15 including such strip-like electrode portions 15a is electrically connected through a contact hole H1 to a drain electrode 30d that extends from above a semiconductor layer 30a of the TFT 30 toward the inside of the pixel area.

The common electrode 13 is formed of a transparent conductive film, such as ITO, for example. The common electrode 13 is planar and provided across the length of the pixel area, and one lengthwise end thereof is electrically connected to the common line 3b at a portion overlapping the common line 3b in plan view.

Such display pixels Pc correspond to three different colors, R, G, and B, respectively, and have a same configuration.

In a pixel area that is defined by the data lines 6a and the scanning lines 3a and lays across and adjacent to the three display pixels Pc(R), Pc(G), and Pc(B), a viewing-angle control pixel Pb has a pixel electrode 18 that is substantially rectangular in plan view. Further, a common electrode 17 is disposed in a position overlapping the pixel electrode 18 in plan view.

Near each of the intersections of the data lines 6a and the scanning lines 3a, a TFT 31 is disposed on the scanning line 3a.

The pixel electrode 18 is formed of a transparent conductive film, such as ITO, for example, and has a plurality of strip-like electrode portions 18a that extend in the length direction of the pixel area and are spaced at predetermined intervals in the width direction. Between the strip-like electrode portions 18a are slit-like spaces, which are hereinafter referred to as slits 18b.

The pixel electrode 18 including such strip-like electrode portions 18a is electrically connected through a contact hole H2 to a drain electrode 31d that extends from above a semiconductor layer 31 a of the TFT 31 toward the inside of the pixel area.

The common electrode 17 is formed of a transparent conductive film, such as ITO, for example. The common electrode 17 is planar and provided across the length of the pixel area, and one widthwise end thereof is electrically connected to the common line 3b at a portion overlapping the common line 3b in plan view.

Further, as shown in FIG. 4B, a light-shielding portion 21 is provided on the counter substrate 20 in such a manner that the light-shielding portion 21 overlaps, in plan view, opposite ends of the plurality of strip-like electrode portions 18a (or the plurality of slits 18b). In other words, opposite ends of the plurality of strip-like electrode portions 18a (or the plurality of slits 18b) are located within a light-shielding region formed by the light-shielding portion 21 and are thus shielded from light. More specifically, on the counter substrate 20, the light-shielding portion 21 is formed in such a manner that the resulting light-shielding region covers, as the length in the direction X, about 5 μm of each end of the slits 18b.

Next, the structure of the components of the display pixels Pc and the viewing-angle control pixels Pb will be described in further detail with reference to FIGS. 5A and 5B.

As shown in FIG. 5A, the display pixel Pc is formed as follows. First, an electrically conductive layer made of a low-resistance interconnect material such as aluminum is formed on the element substrate 10 by sputtering or vacuum deposition, and the formed electrically conductive layer is then patterned by photolithography to form a scanning line 3a. A gate insulating film 11 made of $SiO_2$ (silicon oxide), for example, is formed to cover the scanning line 3a.

An amorphous silicon layer is formed on the gate insulating film 11 and patterned by photolithography to form a semiconductor layer 30a in the form of an island in a position overlapping the scanning line 3a. An electrically conductive layer is formed to cover the semiconductor layer 30a and is patterned by photolithography, thereby integrally forming a source electrode 30s, which overlaps the source region of the semiconductor layer 30a, and a data line 6a, which is connected to the source electrode 30s. A drain electrode 30d is also formed to overlap the drain region of the semiconductor layer 30a.

A first interlayer insulating film 12 made of SiN (silicon nitride), for example, is formed to cover the semiconductor layer 30a, the drain electrode 30d, and the source electrode 30s (data line 6a).

An electrically conductive layer is formed on the first interlayer insulating film 12 and patterned by photolithography to form a common line 3b (not illustrated). A transparent conductive film is formed to cover the common line 3b and then similarly patterned by photolithography to form a common electrode 13.

A second interlayer insulating film 14 made of an acrylic resin material, for example, is then formed to cover the common electrode 13. Further, portions of the first interlayer insulating film 12 and the second interlayer insulating film 14 are etched away to form a hole that reaches the drain electrode 30d extending into the pixel area. On the second interlayer insulating film 14, a transparent conductive film is formed to cover the hole, and then patterned by photolithography to form a contact hole H1 and a pixel electrode 15 connected thereto. The pixel electrode 15 is configured to include a plurality of strip-like electrode portions 15a.

An alignment film 16 made of polyimide resin, for example, is formed to cover the pixel electrode 15. The alignment film 16 is subjected to an alignment treatment, such as rubbing, so as to align liquid crystal molecules LC in a predetermined direction.

On the side of the counter substrate 20 facing the liquid crystal layer 50, first, a light-shielding portion 21 is formed using a resin material having light-shielding properties. The light-shielding portion 21 may be formed by a method in which the resin material is applied thereto by a printing method such as off-set printing, followed by patterning, or in which the resin material with photosensitivity is applied to the entire surface, followed by patterning by light exposure and development.

Next, a photosensitive filter material is applied thereto to cover the light-shielding portion 21, and then exposed to light and developed to form a color filter 22. Needless to say, color filters 22 are separately formed for respective colors, R, G, and B. Such a color filter 22 may be formed by a droplet discharging method (inkjet printing) including forming the light-shielding portion 21 made of a resin material as a partition portion, discharging droplets of a fluid substance containing a filter material into an area defined by the light-shielding portion 21, and drying the same to form a color filter 22 for each color.

Then, an alignment film 23 made of polyimide resin, for example, is formed to cover the color filter 22. The alignment film 23 is, as in the case of the alignment film 16 on the element-substrate-10 side, subjected to an alignment treatment, such as rubbing, so as to align the liquid crystal molecules LC in a predetermined direction.

The following describes a viewing-angle control pixel Pb. Components common to the display pixel Pc described above will be described only briefly. As shown in FIG. 5B, the viewing-angle control pixel Pb is formed as follows. An amorphous silicon layer is formed on a gate insulating film 11 covering a scanning line 3a on the element substrate 10. The amorphous silicon layer is then patterned by photolithography to form a semiconductor layer 31a in the form of an island in a position overlapping the scanning line 3a.

An electrically conductive layer is formed to cover the semiconductor layer 31a and is patterned by photolithography, thereby integrally forming a source electrode 31s, which overlaps the source region of the semiconductor layer 31a, and a data line 6a, which is connected to the source electrode 31s. A drain electrode 31d is also formed to overlap the drain region of the semiconductor layer 31a.

A first interlayer insulating film 12 made of SiN (silicon nitride), for example, is formed to cover the semiconductor layer 31a, the drain electrode 31d, and the source electrode 31s (data line 6a).

An electrically conductive layer is formed on the first interlayer insulating film 12 and patterned by photolithography to form a common line 3b (not illustrated). A transparent conductive film is formed to cover the common line 3b and then similarly patterned by photolithography to form a common electrode 17.

A second interlayer insulating film 14 made of an acrylic resin material, for example, is then formed to cover the common electrode 17. Further, portions of the first interlayer insulating film 12 and the second interlayer insulating film 14 are etched away to form a hole that reaches the drain electrode 31d extending into the pixel area. On the second interlayer insulating film 14, a transparent conductive film is formed to cover the hole. The transparent conductive film is then patterned by photolithography to form a contact hole H2 and a pixel electrode 18 connected thereto. The pixel electrode 18 is configured to include a plurality of strip-like electrode portions 18a.

An alignment film 16 made of polyimide resin, for example, is formed to cover the pixel electrode 18. As mentioned above, the alignment film 16 is subjected to an alignment treatment, such as rubbing, so as to align liquid crystal molecules LC in a predetermined direction.

In the viewing-angle control pixel Pb, on the side of the counter substrate 20 facing the liquid crystal layer 50, a light-shielding portion 21 is formed using a resin material with light-shielding properties, with no color filter 22 being formed.

Then, an alignment film 23 made of polyimide resin, for example, is formed to cover the light-shielding portion 21. As mentioned above, the alignment film 23 is subjected to an alignment treatment, such as rubbing, so as to align the liquid crystal molecules LC in a predetermined direction.

The thus-configured liquid crystal device 100 works as follows. In the display pixel Pc, an electric field generated between the pixel electrode 15 having the strip-like electrode portions 15a and the common electrode 13 controls the alignment direction of liquid crystal molecules in the liquid crystal layer 50 to perform display. Such a liquid crystal device is called a FFS (Fringe Field Switching) mode liquid crystal device. Likewise, in the viewing-angle control pixel Pb, an electric field generated between the pixel electrode 18 having the strip-like electrode portions 18a and the common electrode 17 controls the alignment direction of liquid crystal molecules in the liquid crystal layer 50 to control the viewing angle.

The following describes the optical design of the liquid crystal device 100. As shown in FIG. 6A, the initial alignment of the liquid crystal cell 101 is homogeneous alignment along the pixel column direction, i.e., the direction Y. More specifically, the rubbing direction of the alignment film 16 of the element substrate 10 and the rubbing direction of the alignment film 23 of the counter substrate 20 are both along the direction Y but are oriented at 180° to each other.

Optically, a pair of polarizing plates 19 and 24 are arranged in a crossed Nicols fashion (in such a state that the transmission axes or absorption axes thereof are orthogonal to each other) with the liquid crystal cell 101 therebetween. Specifically, the transmission axis 19t of the polarizing plate 19 on the side where light from an illumination device is incident is in the same direction as the above-mentioned initial alignment direction. In contrast, the transmission axis 24t of the polarizing plate 24 on the side where light exits is in the direction orthogonal to the above-mentioned initial alignment direction.

That is, the incident light is transmitted through the polarizing plate 19 and thus converted into linearly polarized light, and is transmitted through the liquid crystal cell 101. However, the light is then absorbed by the polarizing plate 24, and, therefore, a black display is presented in the undriven state, i.e., the initial alignment state.

As shown in FIG. 6B, the slits 15b of the pixel electrode 15 of the display pixel Pc are inclined at an angle of 5° toward the lower left (85° toward the upper right) with respect to the alignment treatment direction. Therefore, as a result of application of a driving voltage between the pixel electrode 15 having the strip-like electrode portions 15a and the common electrode 13 opposed thereto, an electric field is generated in the direction orthogonal, in plan view, to the direction of extension of the strip-like electrode portions 15a (or slits 15b).

Liquid crystal molecules LC with positive dielectric anisotropy are aligned so that the major axis is in the electric field direction. Therefore, the liquid crystal molecules LC are twisted counter-clockwise in the vicinity of the strip-like electrode portions 15a. As a result, optical rotation occurs in the liquid crystal layer 50 (see FIG. 5A). The incident light converted into linearly polarized light by the polarizing plate 19 rotates while passing through the liquid crystal cell 101, and then passes through the polarizing plate 24. That is, in the driven state, the color given by the color filter 22 is observed. When the different color display pixels Pc forming a pixel Pa are all in the driven state, a white display is presented. Such a display mode is called "normally black mode".

The angle made by the alignment treatment direction and the strip-like electrode portions 15a (or slits 15b) is not limited to 5°. It is set at such an angle that the liquid crystal molecules LC are stably twisted in a fixed direction when an electric field is generated.

In the viewing-angle control pixel Pb, the slits 18b of the pixel electrode 18 extend in the direction orthogonal to the alignment treatment direction. Therefore, as a result of application of a driving voltage between the pixel electrode 18 having the strip-like electrode portions 18a and the common electrode 17 opposed thereto, an electric field is generated in the direction orthogonal, in plan view, to the direction of extension of the strip-like electrode portions 18a (or slits 18b). That is, the electric field is generated in the same direction as the alignment treatment direction. Although liquid crystal molecules LC with positive dielectric anisotropy are aligned so that the major axis is in the electric field direction, because the electric field is in the same direction as the alignment treatment direction, a movement such as twisting does not occur in the vicinity of the strip-like electrode portions 18a. However, the electric field generated between the pixel electrode 18 and the common electrode 17 also works in the thickness direction of the liquid crystal layer 50 as shown in FIG. 5B, and, therefore, the liquid crystal molecules LC aligned in the vicinity of the alignment film 16 covering the pixel electrode 18 are displaced in the direction in which the tilt angle increases.

That is, when the viewing-angle control pixel Pb is driven, as observed from the front, a black display is presented as in the undriven state; however, as observed from a direction oblique to the front, some of the incident light from the polarizing-plate-19 side passes through the liquid crystal layer 50 and the polarizing plate 24 and thus leaks out.

At opposite ends of the plurality of strip-like electrode portions 18a (or slits 18b) of the viewing-angle control pixel Pb, the direction of the electric field generated between the pixel electrode 18 and the common electrode 17 is not necessarily orthogonal to the direction of extension of the strip-like electrode portions 18a. Therefore, there is a possibility that the direction of the major axis of liquid crystal molecules LC changes with the change in the direction of the electric field, causing twisting, which results in light leakage also as seen from the front.

In this embodiment, as shown in FIG. 4B, opposite ends of the plurality of strip-like electrode portions 18a (or slits 18b) are located within the light-shielding region given by the light-shielding portion 21, and this structure makes it possible to prevent such light leakage.

Further, even when such opposite ends are not located within the light-shielding region, because the plurality of strip-like electrode portions 18a extend in the length direction of the substantially rectangular viewing-angle control pixel Pb, the number of the opposite ends is smaller than in the case where they extend in the width direction, and the substantial light leakage amount can thus be reduced.

Figure 7:
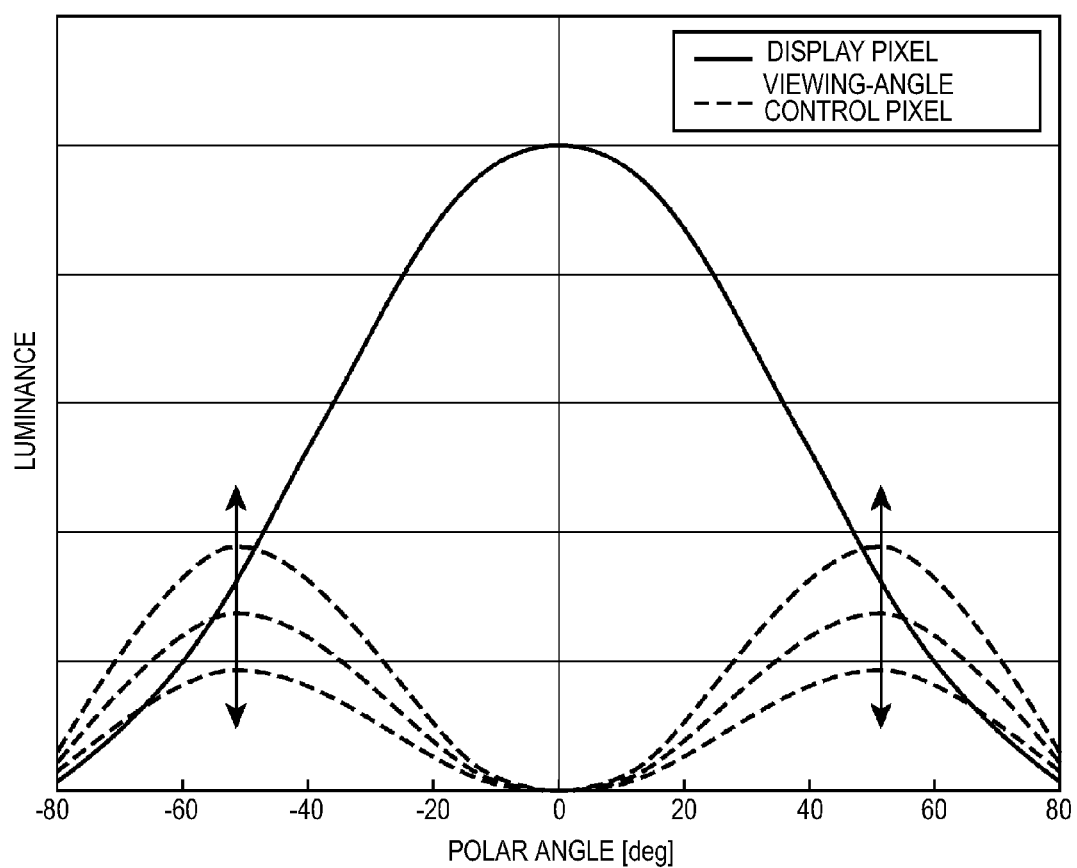
FIG. 7 is a graph showing changes in the luminance of a display pixel and a viewing-angle control pixel in the driven state relative to the polar angle.

FIG. 7 is a graph showing changes in the luminance of a display pixel and a viewing-angle control pixel in the driven state relative to the polar angle. As shown in FIG. 7, the display pixel Pc has the highest luminance as seen from the front. As seen from an oblique direction, the luminance decreases with an increase in polar angle.

The viewing-angle control pixel Pb has the lowest luminance as seen from the front. When seen from a direction oblique to the absorption axis of the polarizing plate 24 (initial alignment direction of liquid crystal molecules), although the luminance once increases with an increase in polar angle, the luminance decreases with a further increase in polar angle. The luminance of the viewing-angle control pixel Pb changes with the driving voltage (electric field strength) applied between the pixel electrode 18 and the common electrode 17 as shown in FIG. 7.

In such a liquid crystal device 100, when the display pixels Pc are driven and the viewing-angle control pixels Pb are also driven at the same time, as seen from the front, the display is beautifully presented in a properly visible fashion. Meanwhile, as seen from a direction oblique to the front, the luminance of the viewing-angle control pixels Pb increases. As a result, the relative contrast of the display pixels Pc decreases, making it difficult to view the display. That is, by turning on and off the viewing-angle control pixels Pb, the actual viewing angle can be freely controlled.

(Second Embodiment)

Figure 8A:
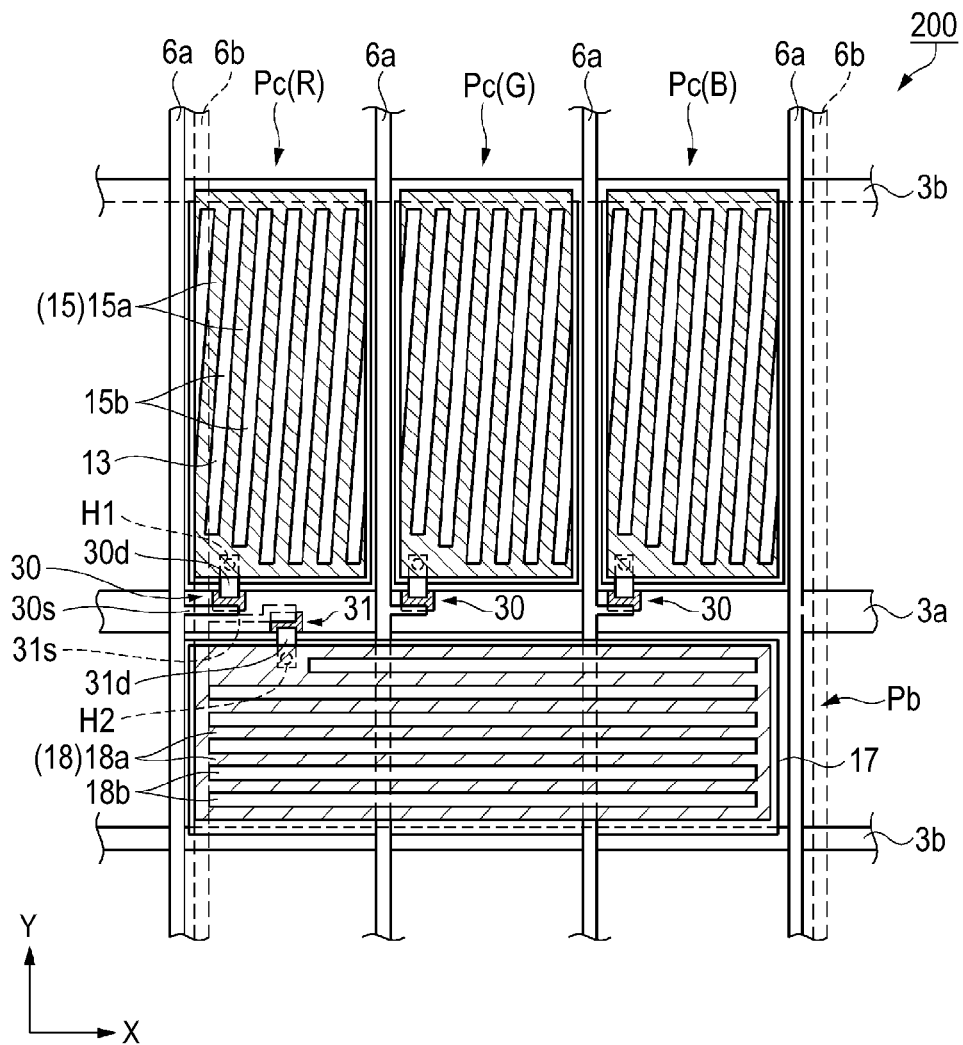
FIG. 8A is a schematic plan view showing the configurations of a display pixel and a viewing-angle control pixel in a liquid crystal device according to a second embodiment.
Figure 8B:
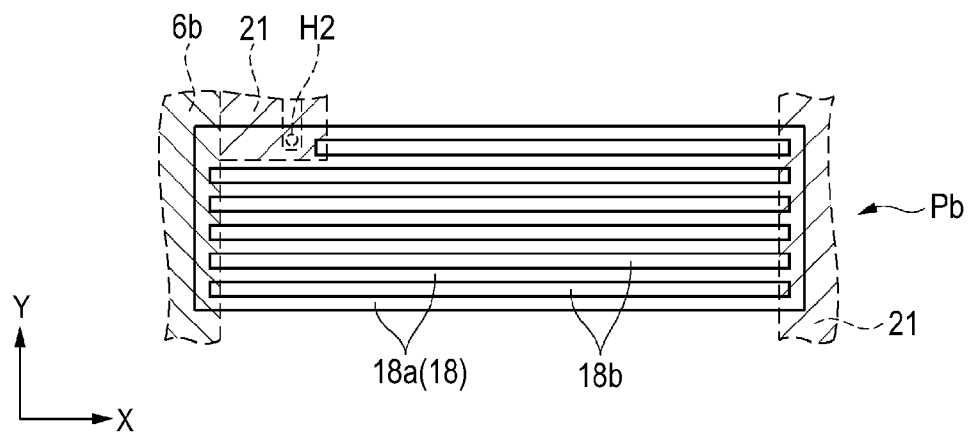
FIG. 8B is a schematic plan view of a light-shielding region in a viewing-angle control pixel.

Next, a liquid crystal device according to a second embodiment will be described with reference to FIGS. 8A and 8B. FIG. 8A is a schematic plan view showing the configurations of a display pixel and a viewing-angle control pixel in the liquid crystal device according to the second embodiment, and FIG. 8B is a schematic plan view of a light-shielding region in a viewing-angle control pixel. Components with the same configurations as in the liquid crystal device 100 of the first embodiment are indicated with the same reference numerals, and will not be described in detail.

As shown in FIG. 8A, the liquid crystal device 200 of the second embodiment is different from the liquid crystal device 100 of the first embodiment in that a single scanning line 3a is shared by display pixels of different colors, Pc(R), Pc(G), and Pc(B), and a viewing-angle control pixel Pb, and that the liquid crystal device 200 has a dedicated data line 6b electrically connected to a TFT 31 for driving/controlling the viewing-angle control pixel Pb.

The arrangement of the display pixels of different colors, Pc(R), Pc(G), and Pc(B), and the viewing-angle control pixel Pb is basically the same as in the first embodiment, but the viewing-angle control pixel Pb is placed adjacent in the direction Y to the display pixels Pc(R), Pc(G), and Pc(B) with the shared scanning line 3a therebetween. The shared scanning line 3a has disposed thereon a TFT 30 and the TFT 31.

The dedicated data line 6b is disposed along a data line 6a connected to the TFT 30 of the red display pixel Pc(R) located at an end of the different color display pixels Pc(R), Pc(G), and Pc(B) arranged side by side in the direction X, and also enters the pixel area of the display pixel Pc(R).

The dedicated data line 6b is formed integrally with a source electrode 31s of the TFT 31 next to the TFT 30 corresponding to the display pixel Pc (R) on the scanning line 3a.

A pixel electrode 18 having a plurality of strip-like electrode portions 18a (or a plurality of slits 18b) in the substantially rectangular viewing-angle control pixel Pb is connected to a drain electrode 31d of the TFT 31 through a contact hole H2.

A common electrode 17 opposed to the pixel electrode 18 is electrically connected to a common line 3b at a portion overlapping the common line 3b in plan view.

Further, as shown in FIG. 8B, the dedicated data line 6b is provided on the element substrate 10 in such a manner that the dedicated data line 6b overlaps, in plan view, one end of the plurality of strip-like electrode portions 18a (or the plurality of slits 18b). Further, a light-shielding portion 21 is provided on the counter substrate 20 in such a manner that the light-shielding portion 21 overlaps, in plan view, the other end of the plurality of strip-like electrode portions 18a (or the plurality of slits 18b). In the vicinity of the contact hole H2, the light-shielding portion 21 partially overlaps, in plan view, one end of the strip-like electrode portions 18a (or slits 18b).

In other words, the ends of the plurality of strip-like electrode portions 18a (or the plurality of slits 18b) are both located within the light-shielding region formed by the light-shielding portion 21 and the dedicated data line 6b, and thus are shielded from light. More specifically, the light-shielding region covers, as the length in the direction X, about 5 μm of each end of the slits 18b.

In such a liquid crystal device 200, the scanning line 3a is shared by the display pixels of different colors, Pc(R), Pc(G), and Pc(B), and the viewing-angle control pixel Pb, and the liquid crystal device 200 has the dedicated data line 6b that sends a control signal to the TFT 31 for driving/controlling the viewing-angle control pixel Pb. Therefore, as compared with the first embodiment in which the data line 6a connected to the TFT 30 of the display pixel Pc(R) is shared, and the scanning line 3a dedicated to the viewing-angle control pixel Pb is provided, the display pixels Pc and the viewing-angle control pixel Pb can be independently driven and controlled without the need for an increase in driving frequency. That is, an increase in power consumption accompanying the increase in driving frequency can be avoided.

Further, even when the provision of the dedicated data line 6b creates steps on the surface on the device-substrate-10 side facing the liquid crystal layer 50, and the thickness of the liquid crystal layer 50 varies due to such steps, within the pixel area of the display pixel Pc(R) of red, that has the lowest visibility among red, green, and blue, the color nonuniformity resulting from variations in the thickness of the liquid crystal layer 50 is hardly noticeable.

In the viewing-angle control pixel Pb, the dedicated data line 6b forms a part of the light-shielding region to suppress light leakage due to twisting of liquid crystal molecules at an end of the plurality of strip-like electrode portions 18a (or slits 18b).

The arrangement of the dedicated data line 6b is not limited thereto. The dedicated data line 6b may also be arranged through the pixel area of the display pixel Pc(B) of blue having the second lower visibility after red.

Third Embodiment

Figure 9:
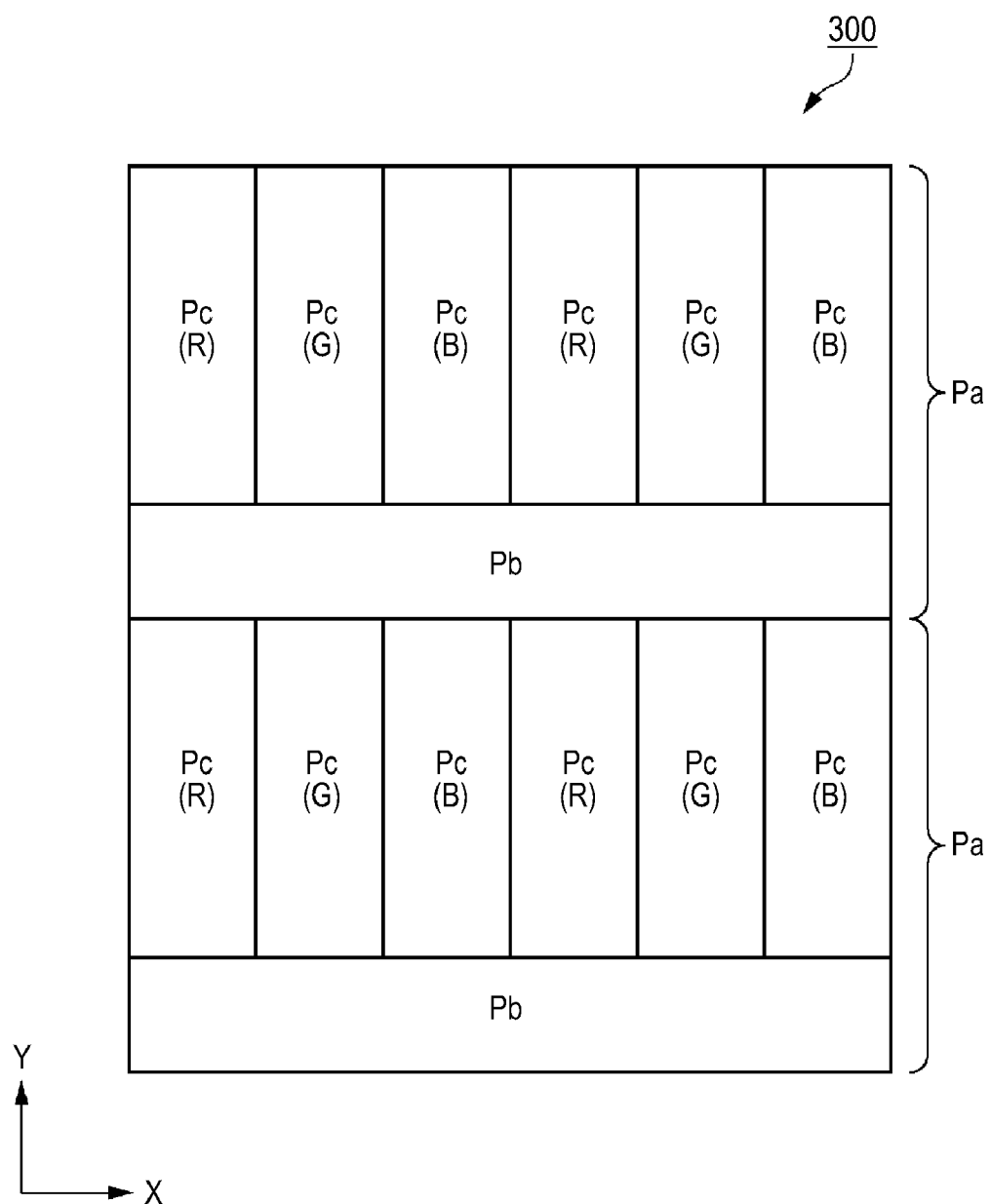
FIG. 9 is a plan view schematically showing the arrangement of display pixels and viewing-angle control pixels in a liquid crystal device according to a third embodiment.

Next, a liquid crystal device according to a third embodiment will be described with reference to FIG. 9. FIG. 9 is a plan view schematically showing the arrangement of display pixels and viewing-angle control pixels in the liquid crystal device according to the third embodiment.

As shown in FIG. 9, taking display pixels of different colors, Pc(R), Pc(G), and Pc(B), forming a pixel Pa as a single set, the liquid crystal device 300 of the third embodiment has a viewing-angle control pixel Pb across and adjacent to a plurality of (in this case, two) sets of display pixels Pc. The basic configurations of the display pixels Pc and the viewing-angle control pixels Pb are the same as the display pixels Pc and the viewing-angle control pixels Pb in the liquid crystal device 100 of the first embodiment or the liquid crystal device 200 of the second embodiment.

Such a liquid crystal device 300 allows the viewing angle to be controlled even with a smaller number of viewing-angle control pixels Pb as compared with the liquid crystal device 100 or the liquid crystal device 200. It is also possible to place opposite ends of the plurality of strip-like electrode portions 18a (or slits 18b) within the light-shielding region to improve the aperture ratio of each viewing-angle control pixel Pb.

(Fourth Embodiment)
<Electronic Apparatus>

Figure 10:
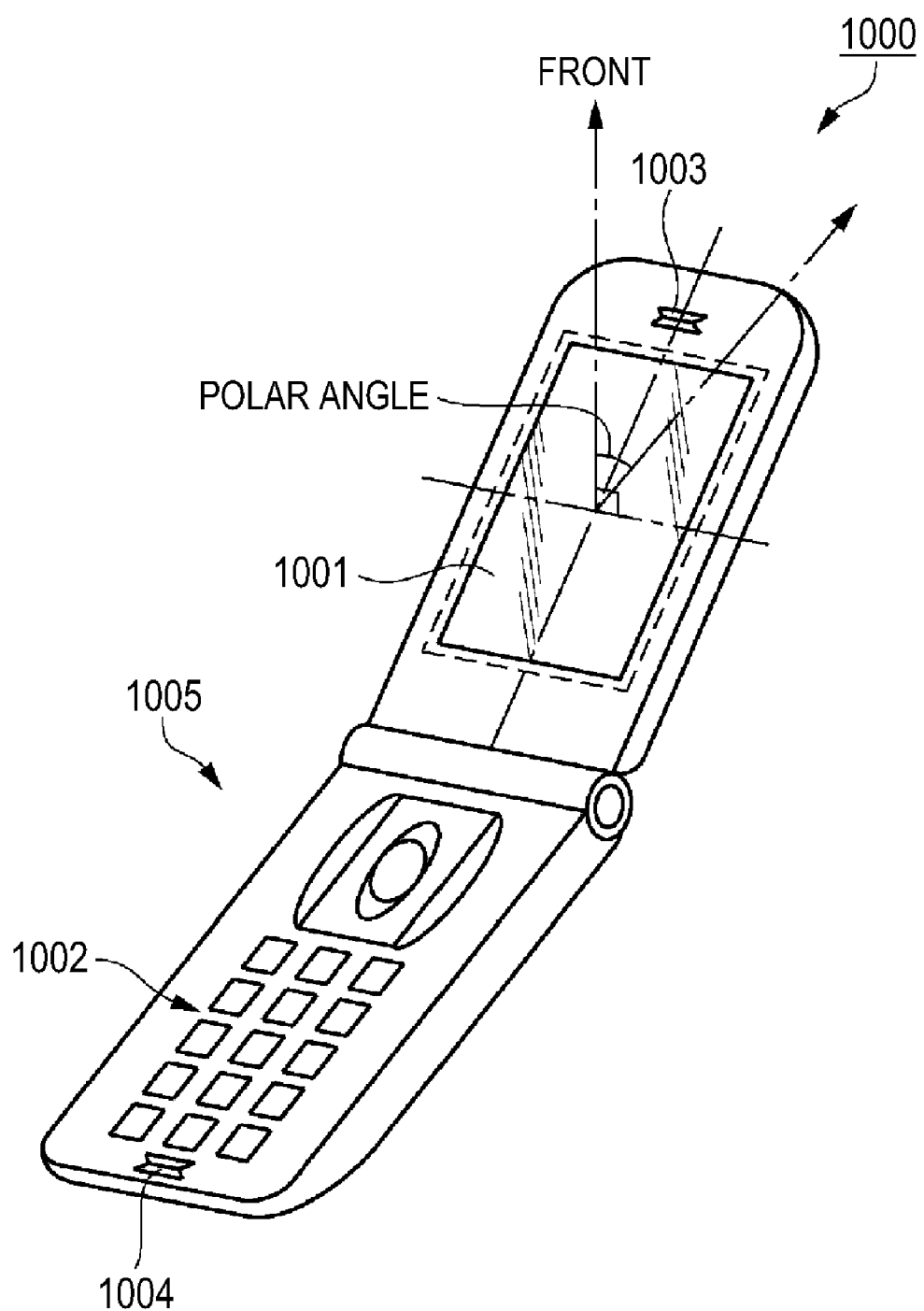
FIG. 10 is a schematic perspective view of a portable phone as an example of an electronic apparatus.

Next, an electronic apparatus according to this embodiment will be described with reference to FIG. 10. FIG. 10 is a schematic perspective view of a portable phone as an example of the electronic apparatus.

As shown in FIG. 10, the portable phone 1000 as the electronic apparatus according to this embodiment has a body portion 1005 including a plurality of operation buttons 1002, an earpiece 1003, a mouthpiece 1004, and a display portion 1001.

The display portion 1001 has mounted thereon the liquid crystal device 100 of the first embodiment, the liquid crystal device 200 of the second embodiment, or the liquid crystal device 300 of the third embodiment.

Such a portable phone 1000 operates as follows. When the display portion 1001 displays an image or information that the user does not want others to see who are positioned at a larger polar angle from the user, the viewing-angle control pixels Pb may be turned on (driven) to control the viewing angle, so that only the user can view the display.

Further, when the display portion 1001 is seen from the front, because light leakage in the viewing-angle control pixels Pb is suppressed, the portable phone 1000 can present a beautiful display.

An electronic apparatus on which the liquid crystal device 100, 200, or 300 can be mounted is not limited to the portable phone 1000. For example, the liquid crystal device can be advantageously used as a display portion of a personal digital assistant, such as a personal computer, a liquid crystal television, a digital still camera, a portable DVD player, a portable navigation system, an electronic notebook, and a portable POS terminal.

In addition to the above embodiments, various modifications thereto will be possible. Hereinafter, such variations will be described.

(Variation 1)

Figure 11A:
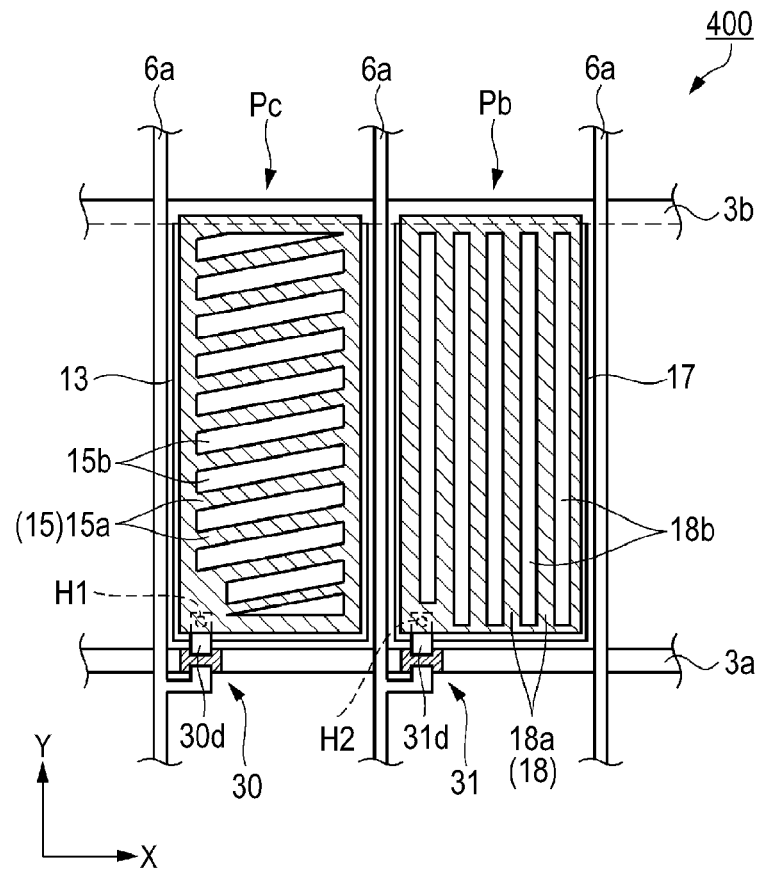
FIGS. 11A and 11B are schematic plan views showing the configurations of a display pixel and a viewing-angle control pixel in a liquid crystal device according to Variation 1.
Figure 11B:
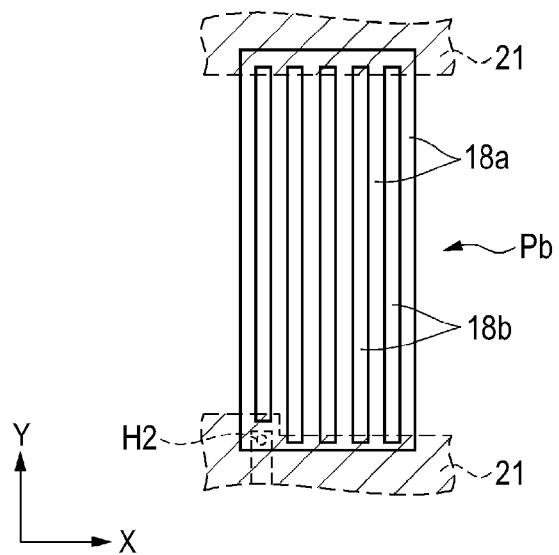
Figure 12A:
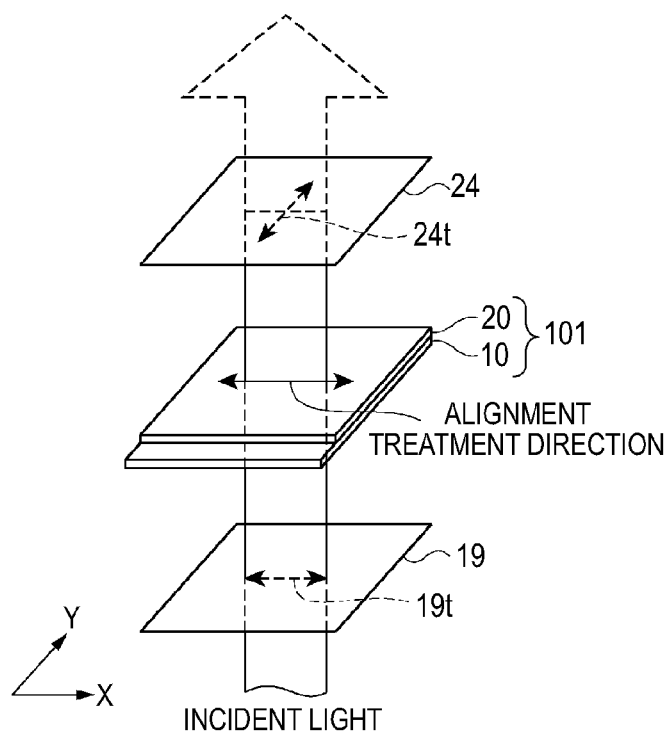
FIGS. 12A to 12C are schematic diagrams showing the optical design requirements of the liquid crystal device according to Variation 1.
Figure 12B:
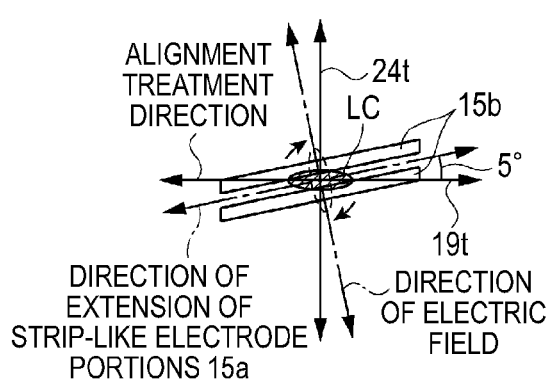
Figure 12C:
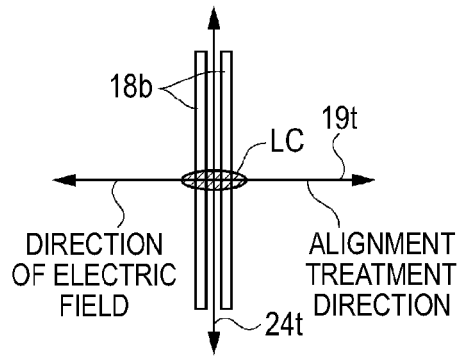

The configurations of the display pixels Pc and the viewing-angle control pixels Pb are not limited to the above examples. FIGS. 11A and 11B are schematic plan views showing the configurations of a display pixel and a viewing-angle control pixel in a liquid crystal device according to Variation 1. FIGS. 12A to 12C are schematic diagrams showing the optical design requirements of the liquid crystal device according to Variation 1. In the following description, components with the same configurations as in the liquid crystal device 100 of the first embodiment are indicated with the same reference numerals.

As shown in FIG. 11A, the liquid crystal device 400 of Variation 1 includes a display pixel Pc and a viewing-angle control pixel Pb each having a substantially rectangular shape. Each viewing-angle control pixel Pb is disposed adjacent in the direction X to a single display pixel Pc (i.e., in the direction of extension of scanning lines 3a).

The display pixel Pc and the viewing-angle control pixel Pb has the FFS electrode structure. In the display pixel Pc, a pixel electrode 15 opposed to a common electrode 13 has a plurality of strip-like electrode portions 15a arranged in the length direction (direction Y) at predetermined intervals. The strip-like electrode portions 15a (or slits 15b) are inclined toward the upper right with respect to the direction X. The pixel electrode 15 is connected to a drain electrode 30d of a TFT 30 through a contact hole H1.

In the viewing-angle control pixel Pb, a pixel electrode 18 opposed to a common electrode 17 has a plurality of strip-like electrode portions 18a arranged in the width direction (direction X) at predetermined intervals. The strip-like electrode portions 18a (or slits 18b) extend along the direction Y. The pixel electrode 18 is connected to a drain electrode 31d of a TFT 31 through a contact hole H2.

As shown in FIG. 11B, opposite ends of the plurality of strip-like electrode portions 18a (or slits 18b) of the viewing-angle control pixel Pb are located within a light-shielding region given by a light-shielding portion 21 formed on the counter substrate 20.

As shown in FIG. 12A, the optical design of the liquid crystal device 400 is such that the initial alignment of the liquid crystal cell 101 is homogeneous alignment along the pixel column direction, i.e., the direction X. More specifically, the rubbing direction of an alignment film 16 of the element substrate 10 and the rubbing direction of an alignment film 23 of the counter substrate 20 are both along the direction X but are oriented at 180° to each other.

Optically, a pair of polarizing plates 19 and 24 are arranged in a crossed Nicols fashion (in such a state that the transmission axes or absorption axes thereof are orthogonal to each other) with the liquid crystal cell 101 therebetween. Specifically, the transmission axis 19t of the polarizing plate 19 on the side where light from an illumination device is incident is in the same direction as the above-mentioned initial alignment direction. In contrast, the transmission axis 24t of the polarizing plate 24 on the side where light exits is in the direction orthogonal to the above-mentioned initial alignment direction.

That is, the incident light is transmitted through the polarizing plate 19 and thus converted into linearly polarized light, and is transmitted through the liquid crystal cell 101. However, the light is then absorbed by the polarizing plate 24, and, therefore, a black display is presented in the undriven state, i.e., the initial alignment state.

As shown in FIG. 12B, the slits 15b of the pixel electrode 15 of the display pixel Pc are inclined at an angle of 5° toward the upper right with respect to the alignment treatment direction. Therefore, as a result of application of a driving voltage between the pixel electrode 15 having the strip-like electrode portions 15a and the common electrode 13 opposed thereto, an electric field is generated in the direction orthogonal, in plan view, to the direction of extension of the strip-like electrode portions 15a (or slits 15b).

Liquid crystal molecules LC with positive dielectric anisotropy are aligned so that the major axis is in the electric field direction. Therefore, the liquid crystal molecules LC are twisted clockwise in the vicinity of the strip-like electrode portions 15a. As a result, optical rotation occurs in the liquid crystal layer 50. The incident light converted into linearly polarized light by the polarizing plate 19 rotates while passing through the liquid crystal cell 101, and then passes through the polarizing plate 24. That is, in the driven state, the color given by a color filter 22 is observed. When the different color display pixels Pc forming a pixel Pa are all in the driven state, a white display is presented.

The angle made by the alignment treatment direction and the strip-like electrode portions 15a (or slits 15b) is not limited to 5°. It is set at such an angle that the liquid crystal molecules LC are stably twisted in a fixed direction when an electric field is generated.

In the viewing-angle control pixel Pb, the slits 18b of the pixel electrode 18 extend in the direction orthogonal to the alignment treatment direction. Therefore, as a result of application of a driving voltage between the pixel electrode 18 having the strip-like electrode portions 18a and the common electrode 17 opposed thereto, an electric field is generated in the direction orthogonal, in plan view, to the direction of extension of the strip-like electrode portions 18a (or slits 18b). That is, the electric field is generated in the same direction as the alignment treatment direction. Although liquid crystal molecules LC with positive dielectric anisotropy are aligned so that the major axis is in the electric field direction, because the electric field is in the same direction as the alignment treatment direction, a movement such as twisting does not occur in the vicinity of the strip-like electrode portions 18a, and the liquid crystal molecules LC are displaced in the direction in which the tilt angle of the liquid crystal molecules LC increases.

Therefore, when the viewing-angle control pixel Pb is driven, as observed from the front, a black display is presented as in the undriven state; however, as observed from a direction oblique to the front, some of the incident light from the polarizing-plate-19 side passes through the liquid crystal layer 50 and the polarizing plate 24 and thus leaks out. That is, luminance in a direction oblique to the absorption axis of the polarizing plate 24 (initial alignment direction of liquid crystal molecules LC) changes, and this allows the viewing angle of the display to be controlled mainly in the direction Y.

Further, as shown in FIG. 11B, opposite ends of the plurality of strip-like electrode portions 18a (or slits 18b) are located within the light-shielding region given by the light-shielding portion 21, and this structure makes it possible to prevent light leakage due to twisting of liquid crystal molecules at such ends.

(Variation 2)

Figure 13:
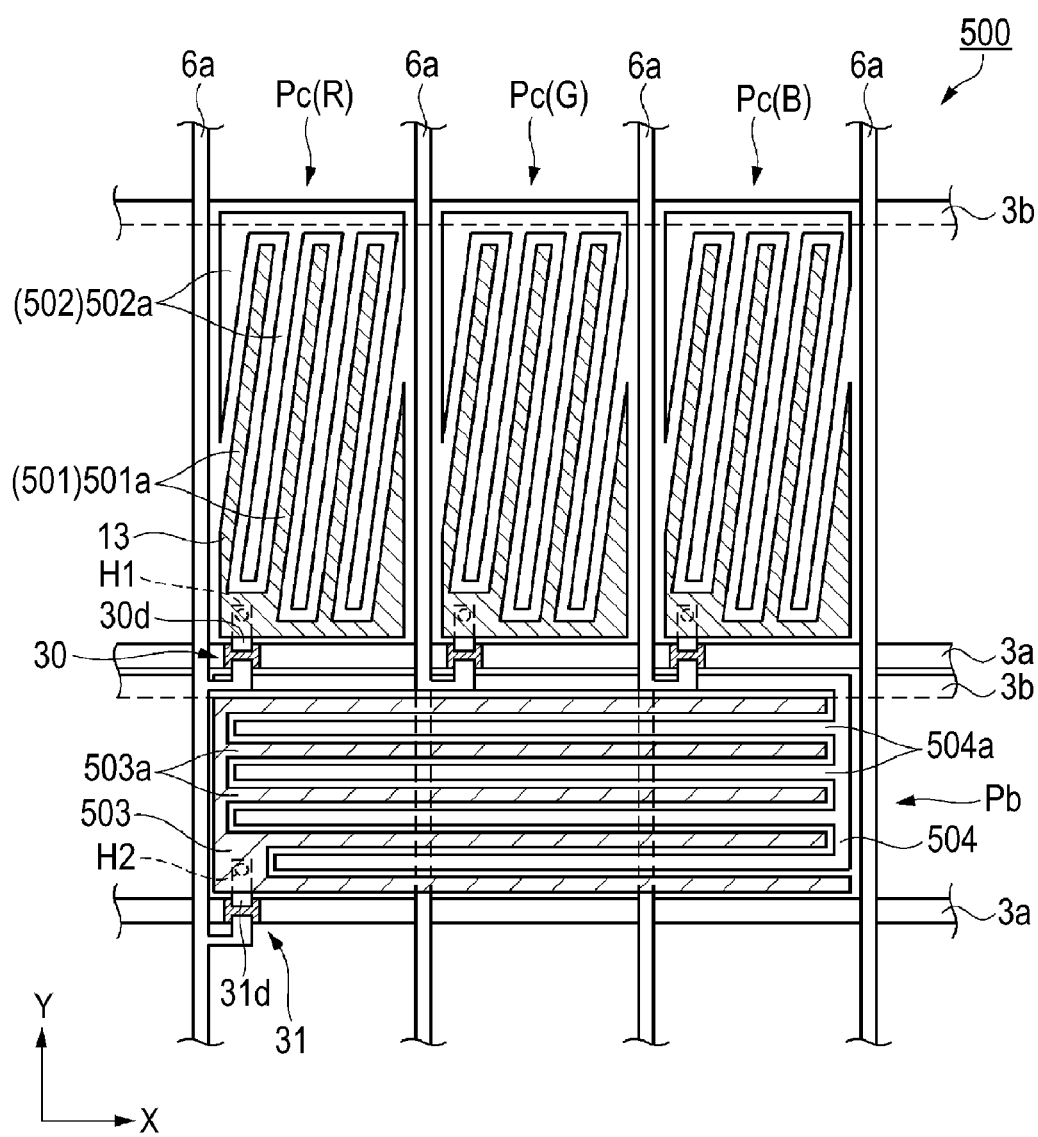
FIG. 13 is a schematic plan view showing the configurations of a display pixel and a viewing-angle control pixel in a liquid crystal device according to Variation 2.

The electrode structure of the display pixels Pc and the viewing-angle control pixels Pb is not limited to the FFS electrode structure. FIG. 13 is a schematic plan view showing the configurations of a display pixel and a viewing-angle control pixel in a liquid crystal device according to Variation 2.

As shown in FIG. 13, the liquid crystal device 500 of Variation 2 has display pixels corresponding to different colors, Pc(R), Pc(G), and Pc(B), and a viewing-angle control pixel Pb each having a substantially rectangular shape. The arrangement of display pixels Pc(R), Pc(G), and Pc(B) relative to the viewing-angle control pixel Pb is the same as in the first embodiment. That is, the substantially rectangular viewing-angle control pixel Pb is disposed across and adjacent to the different color display pixels Pc(R), Pc(G), and Pc(B) arranged in the direction of extension of scanning lines 3a (direction X). However, the display pixels Pc and the viewing-angle control pixel Pb have the IPS (In Plane Switching) electrode structure.

Each display pixel Pc includes a pixel electrode 501 having a plurality of strip-like electrode portions 501a and a common electrode 502 having a plurality of strip-like electrode portions 502a. The strip-like electrode portions 501a and the strip-like electrode portions 502a are alternately disposed at predetermined intervals in the same plane. The strip-like electrode portions 501a and 502a are inclined to cross data lines 6a (85° toward the upper right).

The pixel electrode 501 is connected to a drain electrode 30d of a TFT 30 through a contact hole H1. The common electrode 502 is electrically connected to a common line 3b at a portion overlapping the common line 3b in plan view.

The substantially rectangular viewing-angle control pixel Pb includes a pixel electrode 503 having a plurality of strip-like electrode portions 503a and a common electrode 504 having a plurality of strip-like electrode portions 504a. The strip-like electrode portions 503a and the strip-like electrode portions 504a are alternately disposed at predetermined intervals in the same plane. The strip-like electrode portions 503a and 504a are disposed along the direction of extension of the scanning lines 3a.

The pixel electrode 503 is connected to a drain electrode 31d of a TFT 31 through a contact hole H2. The common electrode 504 is electrically connected to a common line 3b at a portion overlapping the common line 3b in plan view.

In the viewing-angle control pixel Pb, a light-shielding portion 21 is preferably formed on the counter substrate 20 in such a manner that opposite ends of the strip-like electrode portions 503a and 504a are located within a light-shielding region.

When the optical design requirements described with reference to FIGS. 6A to 6C are applied to such a liquid crystal device 500, this achieves the same effects and advantages as in the first embodiment.

(Variation 3)

In the viewing-angle control pixel Pb of the liquid crystal device 100 of the first embodiment, the arrangement of the light-shielding region for shielding opposite ends of the strip-like electrode portions 18a (or slits 18b) from light is not limited to the given example. For example, even when the light-shielding portion 21 is provided to shield either end thereof from light, because this suppresses light leakage due to twisting of liquid crystal molecules LC at the one end, a reasonable contrast is ensured.

Variation (4)

In the viewing-angle control pixel Pb of the liquid crystal device 100 of the first embodiment, the data line 6a connected to the source electrode 31s of the TFT 31 is not limited to the data line 6a connected to the TFT 30 of the red display pixel Pc(R). It may alternatively be the green display pixel Pc(G) or the blue display pixel Pc(B).

(Variation 5)

In the display pixels Pc and the viewing-angle control pixels Pb of the liquid crystal device 100 of the first embodiment, the FFS electrode structure is not limited to the given example. For example, it is possible that in a display pixel Pc, a planar pixel electrode 15 connected to the TFT 30 is formed, and a common electrode 13 having a plurality of strip-like electrode portions is disposed facing the liquid crystal layer 50 and opposed to the pixel electrode 15 with an insulating layer therebetween. That is, the arrangement of the pixel electrode 15 and the common electrode 13 can be the other way around relative to the liquid crystal layer 50. This also applies to the viewing-angle control pixel Pb.

(Variation 6)

The display pixels Pc are not limited to those corresponding to three colors, red (R), green (G), and blue (B). For example, the display pixels Pc may also correspond to multiple colors other than the above-mentioned three colors.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal device comprising:
a pair of substrates;
a liquid crystal layer sandwiched between the pair of substrates;
a display pixel and a viewing-angle control pixel that are substantially rectangular and disposed on at least one of the pair of substrates;
a first electrode and a second electrode disposed in the viewing-angle control pixel; and
a plurality of strip-like electrode portions that are provided to at least either the first electrode or the second electrode and spaced from one another across a width direction of the viewing-angle control pixel,
the liquid crystal device being configured so that an electric field is generated between the first electrode and the second electrode to control the direction of alignment of liquid crystal molecules in the liquid crystal layer, thereby changing the luminance of the viewing-angle control pixel in a direction oblique to the front,
wherein the other of the pair of substrates has color filters of different colors including at least red, green, and blue, the display pixel is disposed corresponding to each of the color filters of the different colors, and the viewing-angle control pixel is disposed across and adjacent to the display pixels of the different colors, and
wherein the display pixel is disposed in an area that is defined by data lines each electrically connected to a thin film transistor for driving and controlling the display pixel and scanning lines intersecting the data lines, and
a thin film transistor for driving and controlling the viewing-angle control pixel has connected thereto a dedicated data line different from the data lines corresponding to the display pixels of the different colors.

2. A liquid crystal device according to claim 1, wherein at least the other of the pair of substrates has a light-shielding region that overlaps, in plan view, at least one end of the strip-like electrode portions.

3. A liquid crystal device according to claim 1, wherein
the display pixel is disposed in an area that is defined by data lines each electrically connected to a thin film transistor for driving and controlling the display pixel and scanning lines intersecting the data lines, and
a thin film transistor for driving and controlling the viewing-angle control pixel has connected thereto one of the data lines, the one data line being corresponding to one of the display pixels of the different colors.

4. A liquid crystal device according to claim 1, wherein the dedicated data line is disposed along one of the data lines, the one data line being corresponding to one of the display pixels of the different colors, the one display pixel being a display pixel of red.

5. A liquid crystal device according to claim 1, wherein the dedicated data line is disposed so as to overlap, in plan view, one end of the strip-like electrode portions.

6. A liquid crystal device according to claim 1, wherein taking the display pixels of the different colors as a single set, the viewing-angle control pixel is disposed adjacent to a plurality of the sets.

7. An electronic apparatus comprising a liquid crystal device according to claim 1.

* * * * *